(12) United States Patent
Grois et al.

(10) Patent No.: US 11,750,811 B2
(45) Date of Patent: Sep. 5, 2023

(54) SYSTEMS, METHODS, AND APPARATUSES FOR PROCESSING VIDEO

(71) Applicant: Comcast Cable Communications, LLC, Philadelphia, PA (US)

(72) Inventors: Dan Grois, Beer-Sheva (IL); Alexander Giladi, Princeton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 233 days.

(21) Appl. No.: 16/376,242

(22) Filed: Apr. 5, 2019

(65) Prior Publication Data

US 2019/0313098 A1    Oct. 10, 2019

Related U.S. Application Data

(60) Provisional application No. 62/653,891, filed on Apr. 6, 2018.

(51) Int. Cl.
| | |
|---|---|
| *H04N 19/124* | (2014.01) |
| *H04N 19/13* | (2014.01) |
| *H04N 19/18* | (2014.01) |
| *H04N 19/186* | (2014.01) |
| *H04N 19/60* | (2014.01) |

(Continued)

(52) U.S. Cl.
CPC ......... *H04N 19/124* (2014.11); *H04N 19/126* (2014.11); *H04N 19/13* (2014.11); *H04N 19/154* (2014.11); *H04N 19/16* (2014.11); *H04N 19/172* (2014.11);

(Continued)

(58) Field of Classification Search
None
See application file for complete search history.

(56) References Cited

U.S. PATENT DOCUMENTS 5,565,920 A * 10/1996 Lee ...................... H04N 19/114
375/E7.22
8,259,795 B2 * 9/2012 Gish ..................... H04N 19/184
375/240.03

(Continued)

FOREIGN PATENT DOCUMENTS

| CN | WO 2018-0495549 A1 * | 3/2018 | ........... H04N 19/126 |
| EP | 2779656 A1 | 9/2014 | |

(Continued)

OTHER PUBLICATIONS

Feng et al., "Adaptive Quantization and Prediction in Speech Coding", ICASSP '82. IEEE International Conference on Acoustics, Speech, and Signal Processing, 1982, pp. 1713-1716 (Year: 1982).*

(Continued)

*Primary Examiner* — Reza Aghevli
(74) *Attorney, Agent, or Firm* — BakerHostetler

(57) ABSTRACT

Systems, methods, and apparatuses are described for processing video. Video content comprising a plurality of frames may be received. A viewing parameters associated with playback of the video content may be determined. One or more of luminance pixel data associated with a frame of the plurality of frames and chrominance pixel data associated with the frame is determined. A quantization matrix associated with the frame may be determined based on the viewing parameter and the one or more of luminance pixel data and chrominance pixel data.

21 Claims, 6 Drawing Sheets

(51) Int. Cl.
*H04N 19/16* (2014.01)
*H04N 19/154* (2014.01)
*H04N 19/172* (2014.01)
*H04N 19/126* (2014.01)

(52) U.S. Cl.
CPC ........... *H04N 19/18* (2014.11); *H04N 19/186* (2014.11); *H04N 19/60* (2014.11)

(56) References Cited

U.S. PATENT DOCUMENTS

| | | | | | |
|---|---|---|---|---|---|
| 8,737,464 | B1* | 5/2014 | Zhang | .................. | H04N 19/176 |
| | | | | | 375/240.03 |
| 8,902,977 | B2* | 12/2014 | Kim | .................... | H04N 19/196 |
| | | | | | 375/240.12 |
| 2002/0154693 | A1* | 10/2002 | Demos | .................. | H04N 19/90 |
| | | | | | 375/E7.184 |
| 2006/0039619 | A1* | 2/2006 | Feng | ....................... | G06T 9/005 |
| | | | | | 375/E7.14 |
| 2009/0052529 | A1* | 2/2009 | Kim | .................... | H04N 19/196 |
| | | | | | 375/E7.126 |
| 2010/0183069 | A1* | 7/2010 | Chen | .................... | H04N 19/124 |
| | | | | | 375/E7.076 |
| 2014/0169451 | A1* | 6/2014 | Cohen | .................. | H04N 19/154 |
| | | | | | 375/240.03 |
| 2014/0369617 | A1* | 12/2014 | Hiwatashi | ............ | H04N 19/176 |
| | | | | | 382/239 |
| 2015/0254811 | A1* | 9/2015 | Sahu | .................... | H04N 13/106 |
| | | | | | 382/154 |
| 2015/0312575 | A1* | 10/2015 | Bryant | .................. | H04N 19/167 |
| | | | | | 375/240.08 |
| 2016/0301894 | A1* | 10/2016 | Bhat | .................... | H04N 19/176 |
| 2018/0302634 | A1* | 10/2018 | Bryant | ................. | H04N 19/146 |
| 2018/0310008 | A1* | 10/2018 | Kopietz | ................. | A63F 13/355 |
| 2018/0367802 | A1* | 12/2018 | Han | ................. | H04N 21/6587 |
| 2019/0191172 | A1* | 6/2019 | Rusanovskyy | ....... | H04N 19/124 |
| 2019/0215517 | A1* | 7/2019 | Ramasubramonian | ...................... | |
| | | | | | H04N 19/70 |
| 2019/0230384 | A1* | 7/2019 | Lee | ......... | H04N 19/117 |
| 2019/0238890 | A1* | 8/2019 | Tsai | ........................ | H04N 19/80 |
| 2019/0261012 | A1* | 8/2019 | Hoarty | ................. | H04N 19/467 |
| 2019/0281310 | A1* | 9/2019 | Lee | .......... | G06V 10/82 |
| 2019/0297337 | A1* | 9/2019 | Ramasubramonian | ...................... | |
| | | | | | H04N 19/85 |
| 2019/0361526 | A1* | 11/2019 | Young | .................... | G06F 3/147 |

FOREIGN PATENT DOCUMENTS

| | | | | |
|---|---|---|---|---|
| WO | WO-2007081713 A1 * | 7/2007 | ............. | H04N 13/15 |
| WO | 2018/049549 A1 | 3/2018 | | |
| WO | WO-2018049549 A1 * | 3/2018 | ........... | H04N 19/126 |

OTHER PUBLICATIONS

Lina Jin et al: "Novel image quality metric based on similarity", Signals, Circuits and Systems (ISSCS), 2011 10th International Symposium ON, 1-15 IEEE, Jun. 30, 2011 (Jun. 30, 2011), pp. 1-4, XP032009467.

Prangnell Lee et al: "Adaptive Quantization Matrices for HD and UHD Resolutions in Scalable HEVC", 2016 Data Compression Conference (DCC), IEEE, Mar. 30, 2016 (Mar. 30, 2016), p. 626, XP033027786.

* cited by examiner

SYSTEMS, METHODS, AND APPARATUSES FOR PROCESSING VIDEO

CROSS-REFERENCE TO RELATED APPLICATIONS

This application claims priority to U.S. Provisional Application No. 62/653,891, filed Apr. 6, 2018, entitled "Systems, Methods, And Apparatuses For Processing Video," which is incorporated by reference herein in its entirety.

BACKGROUND

Video and/or images often present highly bright as well as very dark signals on the same video frame or image, thereby providing a high contrast ratio within the same image. However, coding (e.g., compression) of the video or image content remains a challenge due to user demand for high visual quality, which in turn requires allocating more bits and significantly increasing video coding depth to achieve the desired user quality. In addition, the transmission bandwidth is limited due to typical limitations of the existing network infrastructures, especially when transmitting over wireless/cellular networks. As such, improvements are needed.

SUMMARY

Systems, methods, and apparatuses are described for processing video. Raw (i.e., uncompressed) video data of video content may be received and a portion (e.g., a partition) of a frame of the raw video data may be designated for encoding. The partition of the frame may be with respect to luminance pixel data, chrominance pixel data, or both. The image data of the partition may be subject to quantization during an encoding process. The quantization may comprise application of a quantization matrix. The quantization matrix may be based on one or more viewing parameters associated with playback of the video content. Such a quantized partition may omit image data at some spatial frequencies that would not be or are expected not to be perceivable by a viewer under those viewing parameters. The quantized partition may be incorporated into an encoded video stream that is received by a decoder.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
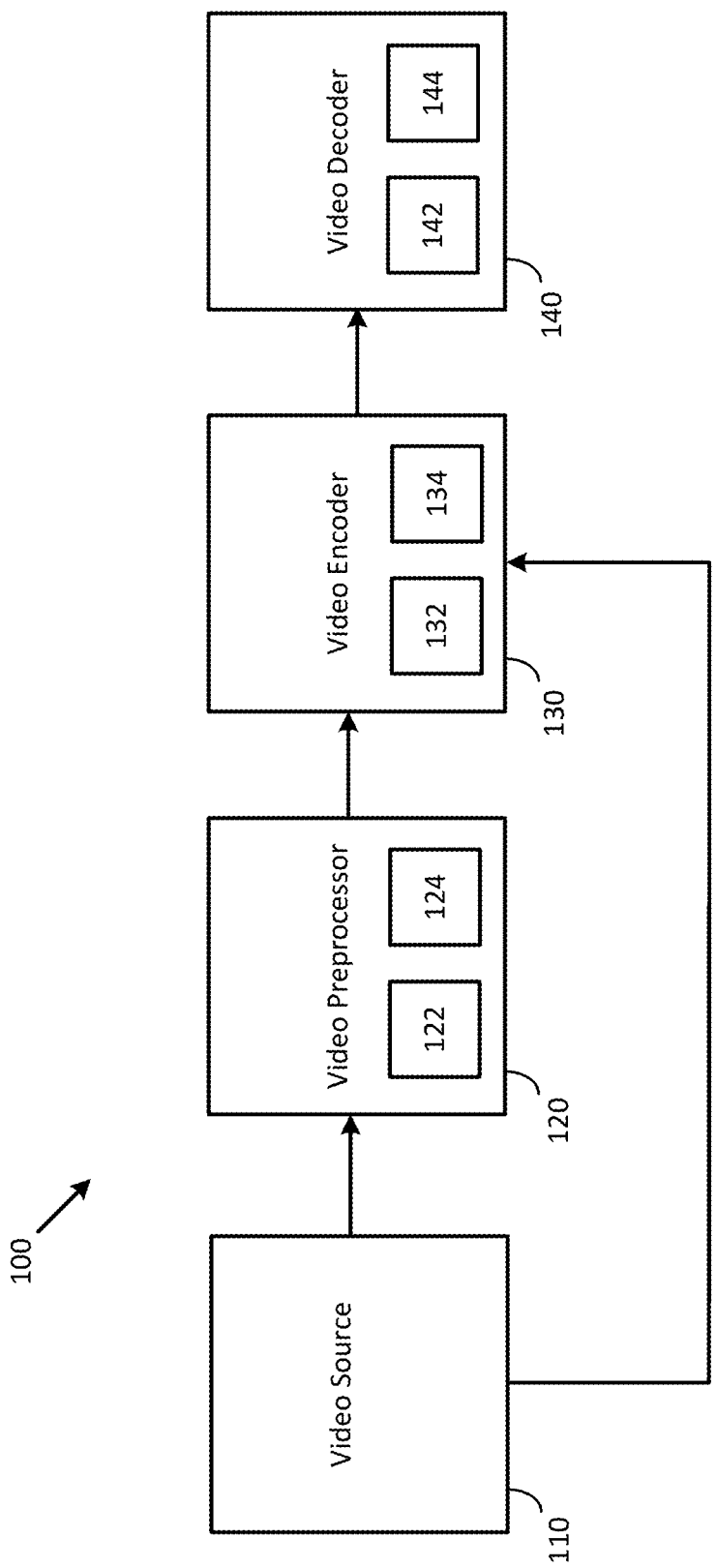
FIG. 1 is a block diagram of a video distribution system.

Systems, methods, and apparatuses are described for processing (e.g., preprocessing, coding, pre-filtering, partitioning, etc.) video data. Video (e.g., High Dynamic Range (HDR) video and other types of video) often comprises relatively high luminance levels and fine shadow details, which extend far beyond some conventional types of video (e.g., Standard Dynamic Range (SDR) video). Video, such as the noted HDR video, may comprise highly bright as well as very dark signals on the same video frame, thereby providing a high contrast ratio within the same image. For example, HDR has gained popularity with the finalization of the High Efficiency Video Coding (HEVC) standard, which allows compressing high-resolution HDR content, such as 3840×2160 (4K) resolutions in terms of luma samples, in a more efficient manner compared to its predecessor H.264/Moving Picture Experts Group (MPEG)-Advanced Video Coding (AVC).

In some cases, visually perceived coding artifacts may be unintentionally introduced into video content during processing (e.g., encoding, compression, etc.). For example, a certain degree of compression may be required to keep compressed video within particular bandwidth constraints (e.g., 6 Megabits (Mb) to 14 Mb per second), thereby introducing said coding artifacts. Moreover, encoding video, such as HDR video, may consume significant computational resources, such as to preserve fine details within the video. Therefore, there is a need to improve the perceived visual quality of the compressed video without increasing its bit-rate.

A viewer may be unable to perceive certain details of a video or image thereof, such as due to limitations of the human eye (which may be represented by the human visual system (HVS)). A viewer may be unable to differentiate between details in the video/image having a high spatial frequency. A viewer may be unable to perceive very minor details in an image and/or very minor movements over several images of the video. A number of factors ("viewing parameters") relating to the viewing experience may influence the viewer's ability to perceive certain video data. For example, one or more of a viewing distance, a pixel density, a pixel length of a sinusoidal grating cycle, a width of a display associated with playback of the video content, a viewing angle, ambient illumination level, and a reflection coefficient of a display associated with playback of the video content may influence the viewer's ability to perceive video data.

In video codecs, quantization matrices may be applied in a frequency domain to transformed pixels (or residuals). Each transform coefficient may be divided by a value defined in the quantization matrix. Values corresponding to high frequencies may be assigned elements within the quantization matrix to effectively zero out the high frequency values.

Encoding/bandwidth/resource cost for areas of a content asset (e.g., video content) that a user cannot perceive may be reduced, such as by use of perceptual quantization matrices to encode frames (or portions of frames) in a particular manner. Based on factors for defining the perceptual quantization matrices and applying contrast sensitivity functions (CSFs) to each entry in the perceptual quantization matrices, the encoder may more efficiently allocate resources to frames or blocks/portions of frames that a user is more likely to perceive. In contrast, blocks/portions of frames that the user is less likely to perceive may be removed and/or be devoted less processing resources.

Viewing parameters associated with the video playback may be leveraged to determine which portions of video data may be omitted in the compressed video data while still maintaining at least the same level of perceived video quality. A quantization matrix that is applied during the video encoding process (or preprocessing) may be determined based on one or more viewing parameters. A CSF may be determined based on the viewing parameter(s) and that, in turn, may be used to determine the quantization matrix.

The size of the compressed video may be reduced, thus saving on storage and bandwidth. Coding of those portions of the video that are perceivable to a viewer may be improved. The processing resources and/or bits that would have been devoted to the omitted video data may be instead applied to the perceivable portions of the video.

FIG. 1 shows a block diagram of a video distribution system 100. The video distribution system 100 may comprise a video source 110, a video preprocessor 120, a video encoder 130, and a video decoder 140. The video source 110 may transmit (e.g., send, deliver, provide, etc.) raw, uncompressed video data, comprising video content (e.g., audio and/or visual), to the video preprocessor 120 and/or the video encoder 130. The video preprocessor 120 may process the raw video data and transmit (e.g., send, deliver, provide, etc.) the preprocessed video data to the video encoder 130. The video encoder 130 may receive the raw video data and/or the preprocessed video data, as the case may be, and encode such video data. The encoded video data may be transmitted (e.g., sent, delivered, provided, etc.) to the video decoder 140. The video decoder 140 may decode the encoded video data. The decoded video data, comprising the video content, may be presented (e.g., caused to be output) to a viewer.

The video source 110 may transmit (e.g., send, deliver, provide, etc.) video (audio and/or visual) content based on a request. The request may be from a user device, such as a mobile device, a set-top box, a cable modem, etc. The request may be based on a schedule (such as a network's programming schedule), which automatically requests video content related to a particular program at a particular time. The video content may comprise a plurality of frames, a single frame among a plurality of frames, or a single independent frame (e.g., not part of a plurality of video frames (ordered or otherwise)). Video content may additionally or alternatively comprise associated audio content. The video source 110 may be video storage, such as from a video-on-demand database. The video source 110 may be a video stream, such as a live feed from a camera. The video content transmitted (e.g., sent, delivered, provided, etc.) from the video source 110 may be raw (e.g., uncompressed, unprocessed, not encoded, etc.) video.

The video preprocessor 120 may receive (e.g., intercept, etc.) video data from the video source 110. The video preprocessor 120 may comprise one or more logical blocks of instructions 122, 124 for preprocessing video. The video source 110 and the video preprocessor 120 may be integrated into one or more computing devices. The video source 110 and the video preprocessor 120 may be local to one another (e.g., in the same room, on the same premises, etc.). The video source 110 and the video preprocessor 120 may be remote from one another. The video preprocessor 120 may execute one or more of the one or more logical blocks of instructions 122, 124 to convert received raw video into preprocessed (e.g., coded, etc.) video.

The video preprocessor 120 and/or the video source 110 may transmit (e.g., send, deliver, provide, etc.) the video data (raw or preprocessed) to the video encoder 130. The video encoder 130 may comprise one or more logical blocks of instructions 132, 134 for encoding video. The video encoder 130 may treat the received video data as input. The video encoder 130 may execute one or more of the one or more logical blocks of instructions 132, 134 to convert received raw video data and/or preprocessed video data into encoded (e.g., compressed, etc.) video data.

The video encoder 130 may encode the video data based on one or more of a variety of video coding formats, such as MPEG-2 Part 2, MPEG-4 Part 2, H.264 (MPEG-4 Part 10), or H.265 (HEVC). The video data may be organized as a series of frames. The series of frames may comprise I-, B-, and P-frames. Each frame may be divided into a number of partitions. Each partition may comprise a plurality of pixels. Depending on the coding format, the partition may be a block, macroblock, coding tree unit, etc. A partition may comprise an 8×8 block of image values. A partition may comprise any other size block of image values. An image value of a partition may represent a pixel. A partition may be with respect to luma (Y) or one of the two chroma components (Cr (U), Cb (V)). The image values of a partition may indicate a luminance component or one of the two chrominance components of the respective pixel of the partition.

The video encoder 130 may convert the image values to the spatial frequency domain using a linear transform, such as a discrete cosine transform (DCT). The DCT may transform a matrix of image values to a corresponding matrix of frequency transform coefficients. The transform coefficients may enable the initial matrix of image values to be recreated. The transform coefficients each may reflect the relative weighting of the respective spatial frequency to be used to re-transform the partition to its original image values. The transform coefficients may indicate the relative contribution or impact that the respective spatial frequency provides in defining the image represented in the partition.

The transform coefficient entries of the DCT-transformed matrix that represent the lower spatial frequencies may be higher values, while the transform coefficient entries that represent the higher spatial frequencies may be lower values, often much lower. Since the higher spatial frequencies may be less noticeable to the human eye—and, therefore, provide relatively little value in maintaining perceived image quality—image data at the higher spatial frequencies may be omitted or ignored when encoding the partition. The determination of the spatial frequencies to omit may be based, at least in part, on viewing parameters relating to playback (e.g., anticipated and/or actual) of the video content.

The video encoder 130 may determine which spatial frequencies to represent in the encoded video during a quantization step. Quantization may effectively downscale the spatial-frequency domain of the DCT-transformed matrix. Quantization of the DCT-transformed matrix may be based on the quantization matrix. The quantization matrix may have dimensions equal to those of the DCT-transformed matrix. The quantized DCT-transformed matrix, determined based on the quantization matrix, may comprise one or more quantized transform coefficients having a zero (0) value. The image data at spatial frequencies corresponding to the quantized transform coefficients having a 0 value may be omitted from the encoded video data.

The quantization matrix may be associated with intra-coding and/or inter-coding. A first quantization matrix may be associated with intra-coding and a second quantization matrix may be associated with inter-coding. The first quantization matrix may be applied to intra-predicted blocks (e.g., intra-predicted partitions) and the second quantization matrix may be applied to inter-predicted blocks (e.g., inter-predicted partitions). A quantization matrix for an inter-predicted block may be based on a quantization matrix for an associated intra-predicted block. A quantization matrix for an intra-predicted block may be based on a quantization matrix for an associated inter-predicted block. The inter-predicted block and the intra-predicted block may be blocks of the same frame.

The quantization matrix may be associated with a luma component and/or a chroma component. The chroma component may comprise a first chroma component and a second chroma component. Different quantization matrices may be applied to a luma component and a corresponding chroma component of the same partition. A first quantization matrix may be associated with a luma component, a second quantization matrix may be associated with a first chroma component, and a third quantization matrix may be associated with a second chroma component. The first quantization matrix may be applied to a luma component of a partition, the second quantization matrix may be applied to a first chroma component of the partition, and the third quantization matrix may be applied to a second chroma component of the partition.

The quantization matrix may be used to determine, based on known or estimated viewing parameter(s), the spatial frequencies at which image data is omitted from the encoded video data and the spatial frequencies at which image data is included in the encoded video data. Thus, the quantization matrix may be determined based on one or more of the viewing parameters associated with playback (or expected playback) of the video data. The viewing parameter may comprise one or more of a viewing distance, a pixel density, a pixel length of a sinusoidal grating cycle, a width of a display associated with playback of the video content, a viewing angle, ambient illumination level, and a reflection coefficient of a display associated with playback of the video content.

The determination of a quantization matrix may not be limited to merely increasing or decreasing a universal spatial frequency threshold for the partition. The quantization matrix may be determined to affect horizontal spatial frequency and vertical spatial frequency independent of one another. A quantization matrix may be determined that tends to cause image data with high vertical spatial frequency to be omitted but allows image data with high horizontal spatial frequency to be retained in the encoded video data, and vice versa. The quantization matrix may be determined to achieve any combination of possible spatial frequency profiles.

The quantization matrix may be determined based on a CSF. The CSF may be based on the one or more viewing parameters. A CSF may be defined according to the relationship between a variable spatial frequency and a variable contrast sensitivity (e.g., defined by the HVS). A CSF may represent the threshold spatial frequency and/or contrast sensitivity at which the image data at that spatial frequency is not perceptible by a viewer. In particular, the determined CSF may represent the threshold spatial frequency and/or contrast sensitivity at which the image data at that spatial frequency is not perceptible by a viewer under viewing conditions indicated as the viewing parameters.

The quantization matrix for a partition may be based on a characteristic of the partition. The quantization matrix for a partition may be based on a characteristic of the frame comprising the partition. A characteristic of the partition and/or the frame may be the video content indicated by the partition and/or frame. The video content may comprise visual details (with respect to luma and/or chroma) having a high spatial frequency (e.g., a spatial frequency above a threshold spatial frequency). The visual details having a high spatial frequency may indicate small details in the video content. The video content may comprise a texture. A characteristic of the partition and/or frame may be motion activity. The motion activity may be observed in the video content indicated by the partition and/or the frame. The motion activity may be indicated by one or more motion vectors associated with the partition and/or frame. A characteristic of the partition and/or frame may be a resolution of the partition and/or the frame. A characteristic of the partition and/or frame may be a resolution of the video content indicated by the partition and/or frame.

A characteristic of the partition and/or frame may be a quadtree structure associated with the partition and/or frame. A characteristic of the partition and/or frame may be a residual quadtree structure associated with the partition and/or frame. A characteristic of the partition and/or frame may be the size (e.g. the dimensions) of the partition and/or frame. A characteristic of the partition and/or frame may be a size of a coding unit associated with the partition and/or frame. A characteristic of the partition and/or frame may be a size of one or more transform units associated with the partition and/or frame.

The quantization matrix may be based on the sequential position of the frame within the video stream. Different quantization matrices may be determined for different portions of a video stream. The quantization matrix may be based on the group of pictures (GOP) to which the frame is a part. The quantization matrix may be based on the frame's relation to a scene cut. The frame's relation to the scene cut may be with respect to the display time of the frame and the display time of the scene cut. The frame's relation to the scene cut may be with respect to the sequential difference, in the display time ordering, between the frame and the scene cut frame(s).

Determining the quantization matrix based on the viewing parameters and/or the CSF may comprise selecting the quantization matrix from a plurality of candidate quantization matrices. The candidate quantization matrices may each correspond to various profiles of viewing parameters. The quantization matrix may be based on the candidate viewing parameter having a viewing parameter profile that most closely matches the actual viewing parameters of the viewing environment.

The quantization matrix may be realized in different dimensions, such as 4×4, 8×8, 16×16, or 32×32. The transform matrix or matrices, to which the quantization matrix may be applied, may be sized in corresponding dimensions as the quantization matrix. A quantization matrix dimensioned in a relatively small size (e.g., 4×4 or 8×8) may be up-sampled to determine a larger quantization matrix (e.g., 32×32).

The video encoder 130 may use a prediction function as part of the encoding process. The prediction may be performed with respect to a partition of a frame. The prediction may be based on the same frame (intra prediction), another frame (inter prediction), or both. The prediction may be spatial or temporal. The prediction may comprise motion estimation, which may also be spatial or temporal. The image values of a partition may indicate a residual value between the raw image values and those resulting from the partition. The residual values may be subjected to transform, quantization, etc.

The video encoder 130 may cause the matrix of quantized transform coefficients for the partition to undergo entropy encoding (e.g., Huffman coding, etc.), with the output being added to the coded video stream. The entropy encoding may be a lossless compression. The entropy encoding may be a run-length encoding algorithm. In the entropy encoding process, the redundant quantized transform coefficients may be compressed into a representation requiring less bits than would otherwise be the case.

Although the systems, methods, and apparatuses described herein are generally described in reference to the video encoder 130, it is understood that the video preprocessor 120 may perform, at a preprocessing stage, some or all of the disclosed techniques for removing image data occurring at imperceptible spatial frequencies based on viewing parameters.

The video encoder 130 may transmit (e.g., send, deliver, provide, etc.) the video to a device requesting the video content. The video encoder 130 and one or more of the video source 110 and the video preprocessor 120 may be integrated into one or more computing devices. The video preprocessor 120 and the video encoder 130 may be local to one another (e.g., in the same room, on the same premises, etc.). The video preprocessor 120 and the video encoder 130 may be remote from one another.

The video encoder 130 may transmit (e.g., send, deliver, provide, etc.) the encoded video data to the video decoder 140 in a video stream. The video stream may comprise one or more quantization matrices. The quantization matrices indicated in the video stream may be associated with a portion of the video stream. The quantization matrix or matrices indicated in the video stream may have been that/those used to encode the portion of the video stream. The quantization matrices in the video stream may be indicated by one or more sequence parameter sets (SPS) and/or picture parameter sets (PPS) of the video stream. The quantization matrices may be transmitted (e.g., sent, delivered, provided, etc.) to the decoder outside of the video stream.

The video decoder 140 may comprise one or more logical blocks of instructions 142, 144 for decoding video. The video decoder 140 may be realized as a user device or component thereof. The video decoder 140 may receive the encoded video data from the video encoder 130. The video decoder 140 may receive the determined quantization matrix and/or matrices associated with the encoded video data. The video decoder 140 may receive the quantization matrix and/or matrices as part of the video stream indicating the encoded video data. The video decoder 140 may execute one or more of the one or more logical blocks of instructions 142, 144 to convert (e.g., decode, determine, etc.) received encoded video data to decoded (e.g., uncompressed, determined, etc.) video data. The video decoder 140 may decompress the encoded video data using an entropy decoder. The video decoder 140 may perform an inverse transform on the decompressed quantized transform coefficients from the video stream, thus determining a decoded image representing the original partition. The decoded image may be not an exact replication of the original. It may be likely that the decoded image is not an exact replication of the original. The image data with spatial frequencies that were determined to have transform coefficients of zero by the quantization process (e.g., according to the quantization matrix based on viewing parameters and/or a CSF that was based on the viewing parameters) may be absent from the decoded image. At least some of the absent image data may be image data with spatial frequencies that are not perceivable by a viewer under viewing conditions indicated by the one or more viewing parameters.

The encoded video data represented in the video stream sent to the video decoder 140 may be selected from a plurality of candidate sets of encoded video data. The candidate sets of encoded video data each may be encoded using a different quantization matrix. The different quantization matrices each may correspond to (e.g., be based on) a profile of viewing parameter(s). The encoded video data that is selected for transmission to the video decoder 140 associated with particular viewing parameter(s) may have been encoded using a quantization matrix corresponding to a profile of view parameter(s) that matches or most closely matches the actual particular viewing parameter(s) associated with the video decoder 140.

The video decoder 140 may output or cause to output the decoded video data. The decoded video data may be output to a viewer, such as via the user device and/or a display associated with the user device. The decoded video may be output to a viewer under conditions the same or similar, at least in some aspects, to the viewing conditions reflected in the viewing parameter(s) that were used to determine the quantization matrix applied during the earlier encoding process.

Any combination or sub-combination of the video source 110, video preprocessor 120, video encoder 130, and/or video decoder 140 may be located local (e.g., in the same room, same premises, etc.) to one another. The video source 110 may be located at a first location, the video encoder 130 (and/or the video preprocessor 120) may be located at a second location, and the video decoder 140 may be located at a third location, with the first, second, and third locations being different from one another. The video source 110 and the video encoder 130 may be located at a first location and the video decoder 140 may be located at a second location. Any combination or sub-combination of the video source 110, video preprocessor 120, video encoder 130, and/or video decoder 140 may be realized as a computing device, such as a user device. The video source 110 and video encoder 130 (and the video preprocessor 120, if so applicable) may be realized as a first computing device (e.g., a first mobile and/or user device, etc.) and the video decoder 140 may be realized as a second, different computing device (e.g., a second mobile and/or user device, etc.). The video encoder 130 and video decoder 140 (and/or the video source 110 and video preprocessor 120, as the case may be) may be realized as a unitary computing device. The decoding performed by the video decoder 140 and the encoding performed by the video encoder 130 may be part of a video processing operation acting, at least initially, on raw video data. The video processing operation may ultimately output encoded video data by alternately performing encoding and decoding over several iterations.

A video delivery system (e.g., a Video-On-Demand (VOD) system) may comprise, at least in part, a video distribution system (e.g., the video distribution system 100). The video delivery system may comprise a server (e.g., a VOD server), which may be or may comprise a video source (e.g., the video source 110). The server may receive a request for video content from a set-top box. The system may comprise a processing unit to receive raw video from the server. The server may transmit raw video related to the received request to the processing unit. The processing unit may be or may comprise a video preprocessor (e.g., the video preprocessor 120) and/or a video encoder (e.g., the video encoder 130). The processing unit may comprise one or more logical blocks of instructions to preprocess received video for easier (e.g., more efficient, faster, etc.) processing by a video encoder. The processing unit may comprise one or more logical blocks of instructions to encode raw and/or preprocessed video data. The processing unit may transmit the processed (e.g., encoded) video to the set-top box. The set-top box may comprise a video decoder (e.g., the video decoder 140). The video decoder may decode the encoded video data. The set-top box may cause output of the resultant decoded video, such as via a display associated with the set-top box.

Figure 2:
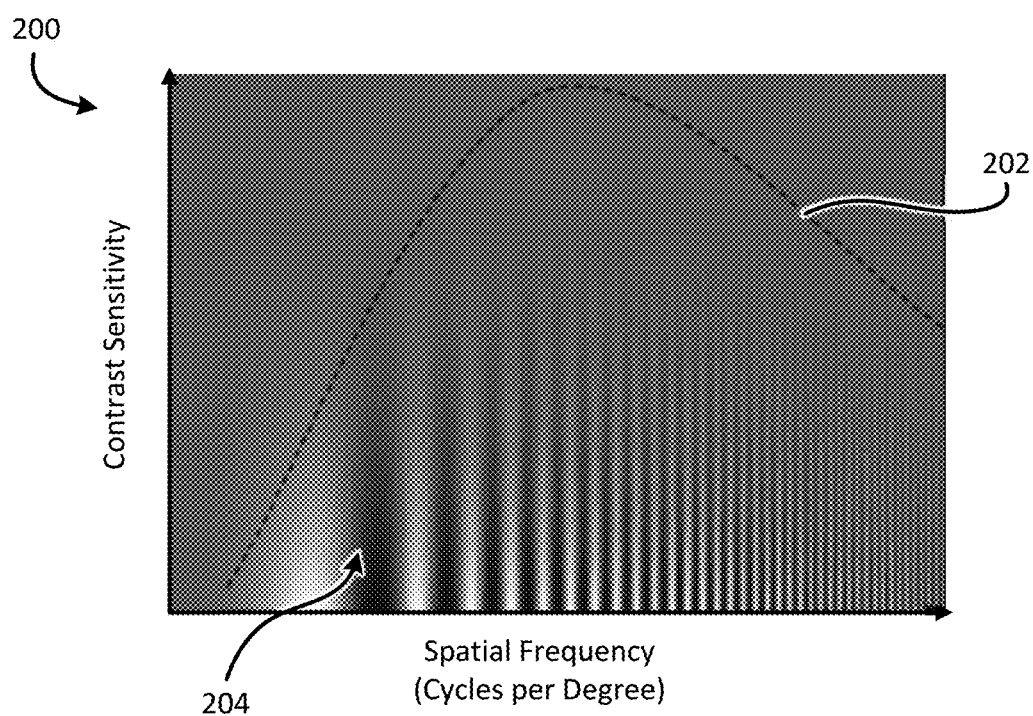
FIG. 2 is a graphical representation of values relating to contrast sensitivity.

FIG. 2 shows a graph 200 relating to contrast sensitivity. The graph 200 comprises a vertical axis indicating a contrast sensitivity measurement and a horizontal axis indicating an increasing spatial frequency (e.g., cycles per degree). Contrast sensitivity may refer to an individual's ability to visually differentiate between—or a sensitivity to—two or more visual aspects in a video or image. Those visual aspects may relate to luminance (perceived "brightness"), as may be the case when a video or image comprises contiguous areas having varying degrees of luminance (e.g., black and white areas). Contrast sensitivity to varying degrees of luminance may be referred to as achromatic contrast sensitivity. Contrast sensitivity relating to chrominance (i.e., perceived "color") may be referred to as chromatic contrast sensitivity. Chromatic contrast sensitivity may indicate an ability to differentiate between contiguous areas having varying chrominance characteristics, such as contiguous areas having two different colors, a color and white, or a color and black.

Due to limitations of the human eye and visual system, contrast sensitivity to luminance is significantly greater than contrast sensitivity to chrominance. As a consequence, visual information in an image is more significantly carried in the luminance aspects rather than the chrominance aspects. Taking an extreme example, video content displayed on a black-and-white television set is stripped of all chrominance aspects, yet may be readily perceived and understood by a viewer. In the converse case, however, video content displayed with only chrominance components and no luminance would be largely indecipherable to a viewer.

Contrast sensitivity may be individual-specific, although the Human Visual System (HVS) model may provide a standard measure for contrast sensitivity, as well as other attributes or functions relating to visual perception. Reference to contrast sensitivity and other associated concepts may be made with respect to the HVS, unless indicated otherwise.

Further relating to chrominance, a chromatic contrast sensitivity may separately describe a sensitivity to one or more components of color in a color space or system. In a YUV-type color space, Y represents luminance, U represents a first color component, and V represents a second color component. YCbCr is one type of YUV color space, with Y again representing a luminance component, Cb representing a blue-difference chroma component (e.g., blue minus Y), and Cr representing a red-difference chroma component (e.g., red minus Y). The YCbCr color space is commonly associated with digital video, as opposed to its YPbPr analog counterpart. Another color space may be ICtCp, with I indicating a luma component, Ct indicating a blue-yellow chroma component, and Cp indicating a red-green chroma component. A chromatic contrast sensitivity may separately indicate a sensitivity to a particular one of the U (e.g., Cb) or the V (e.g., Cr) color components. A chromatic contrast sensitivity may indicate a sensitivity to a combination of the U and the V color components. A chromatic contrast sensitivity may apply to any color space and/or any combination of color spaces.

A CSF may represent a relationship between contrast sensitivity and a spatial frequency of an associated visual stimuli. A CSF may indicate the contrast thresholds at which variations in luminance and/or chrominance, along a continuum of spatial frequencies, can no longer be resolved. A visual stimuli associated with contrast sensitivity (e.g., achromatic contrast sensitivity, etc.) may comprise a series of alternating black and white bars arranged as a sine-wave grating. The widths of the black and white bars progressively decrease (i.e., their spatial frequency increases) and the contrast between neighboring black and white bars likewise decreases progressively along the bars' lengths. A similar sine-wave grating may be configured with bars of alternating colors rather than black and white. The alternating colors presented in a sine-wave grating may each be colors presented without a luminance component ("chromaticity"). A sine-wave grating comprising alternating colors may be associated with a chromatic contrast sensitivity and thus also a chromatic CSF. It is already noted that a black and white sine-wave grating may be associated with an achromatic contrast sensitivity. Thus, a black and white sine-wave grating may be additionally associated with an achromatic CSF.

The graph 200 comprises a sine-wave grating 204 with a series of alternating black and white bars. The progressive increase of spatial frequency towards the right in the graph 200 is visually reflected in the corresponding decrease in the width of each bar, which also has the effect of decreasing the distance between successive bars of the same type (e.g., from black bar to black bar or from white bar to white bar). It will also be observed that the contrast between neighboring black and white bars is greatest at the bottom of the graph 200 proximate the horizontal axis and progressively decreases as the bars extend vertically upward from the horizontal axis. In this respect, the vertical axis further maps a progressively decreasing contrast.

A CSF 202 is shown on the graph 200. The CSF 202 may be determined according to one or more viewing parameters. As already noted, a CSF indicates a contrast threshold at which a person (according to the HVS model) is no longer able to perceive variations in contrast over a continuum of one or more spatial frequencies. Here, the (achromatic) CSF 202 indicates the contrast threshold at which a person becomes unable to perceive the transitions between the black and white bars over the continuum of spatial frequencies indicated by the horizontal axis. Thus, a person would be unable to perceive the transitions between the white and black bars under the contrast and spatial frequency conditions represented by the area(s) of the graph 200 that are above the CSF 202. Conversely, a person would be able to perceive the transitions between the black and white bars under the conditions represented by the area(s) below the CSF 202. The perceptibility of the black and white bars indicated by the CSF 202 is borne out by the visual representation of the black and white sine-wave grating 204. While the graph 200 and CSF 202 relate to achromatic contrast sensitivity, these concepts may be equally applicable to chromatic contrast sensitivity.

By determining a CSF, based on viewing parameters, and using that CSF to generate a quantization matrix that is then applied to video data, a significant reduction of an overall High Dynamic Range (HDR) video bit-rate may be achieved with substantially no degradation in the perceived visual quality. The CSF may be based on a Human Visual System (HVS) nonlinear transformation model followed by a Modulation Transfer Function (MTF). Additionally or alternatively, the CSF may be generated, for example, in accordance with one or more of the following: Barten (Ramp) threshold and Schreiber threshold.

Table 1 shows a first 4×4 quantization matrix.

TABLE 1

| 16 | 16 | 16 | 16 |
|----|----|----|----|
| 16 | 16 | 16 | 16 |
| 16 | 16 | 16 | 16 |
| 16 | 16 | 16 | 16 |

The first quantization matrix shown in Table 1 may be a flat quantization matrix. The first quantization matrix shown in Table 1 may be associated with video content. The first quantization matrix may have been determined without use of one or more parameters. The first quantization matrix may have been determined without use of a viewing parameter associated with playback of the video content. The first quantization matrix may refer to luma and/or chroma (e.g., one of two chroma components). The first quantization matrix may refer to inter-coding or intra-coding.

Table 2 shows a second 4×4 quantization matrix.

TABLE 2

| 16 | 16 | 16 | 16 |
|----|----|----|----|
| 16 | 16 | 16 | 16 |
| 16 | 16 | 17 | 18 |
| 16 | 16 | 18 | 19 |

The second quantization matrix shown in Table 2 may be determined based on one or more variables. The second quantization matrix shown in Table 2 may be associated with video content. The second quantization matrix may be determined based on one or more viewing parameters associated with playback of the video content. The second quantization matrix may be determined based on a CSF. The CSF may be based on one or more viewing parameters associated with playback of the video content. The CSF may indicate the spatial frequencies that the HVS is able to perceive under the viewing conditions.

Based on the second quantization matrix shown in Table 2, encoded video data may be determined that omits at least some image data that the HVS is not able to perceive under the viewing conditions. The second quantization matrix may comprise values higher (e.g., values of 17, 18, and 19) than the corresponding values (values of 16) found in the flat, first quantization matrix shown in Table 1. These higher values may be observed in the lower right portion of the second quantization matrix. A lower right portion of a quantization matrix (and a DCT-transformed matrix, likewise) may generally correspond to higher spatial frequencies. Accordingly, the 17, 18, and 19 values in the second quantization matrix may cause the encoding process, based on the second quantization matrix, to omit the image data at the higher spatial frequencies corresponding to the 17, 18, and 19 values in the second quantization matrix. The omitted image data may comprise image data that is not perceptible by the HVS. Encoded video data determined based on uncompressed video data and the first quantization matrix shown in Table 1 may comprise image data that is omitted from encoded video data determined based on the same uncompressed video data and the second quantization matrix (instead of the first). The second quantization matrix shown in Table 2 may refer to luma and/or chroma (e.g., one of two chroma components). The second quantization matrix may refer to inter-coding or intra-coding.

A quantization matrix, based on the determined CSF, may be customized such that relatively high spatial frequencies, which are not detectable/visible by the HVS, are removed, thereby allowing reduction of the overall bit-rate of the encoded video data without decreasing the visual video quality and/or minimizing decreases to visual video quality. The HDR video may be compressed in a much more efficient manner by allowing an encoder to allocate more bits to more important and/or noticeable regions within each video frame and fewer bits to high spatial frequencies regions, which may be less important and/or less noticeable regions, instead of allocating equal bits to all regions of each video frame.

Figure 3:
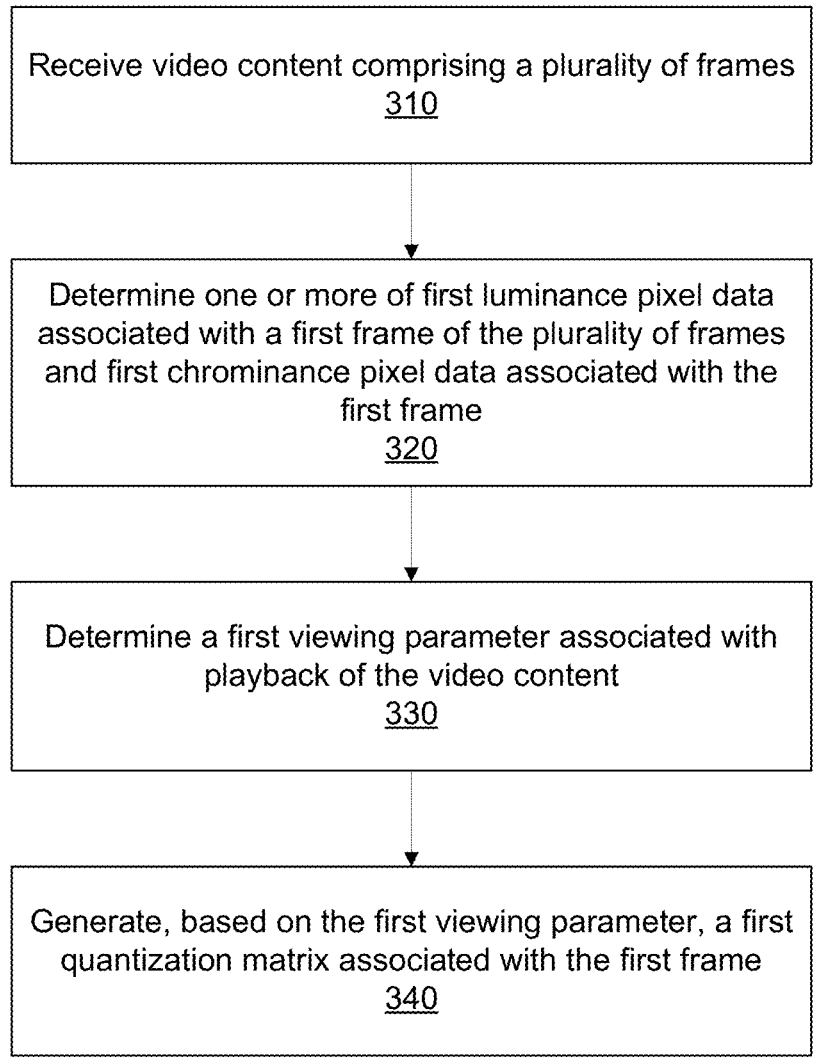
FIG. 3 is a flow diagram of a method.

FIG. 3 is a flow diagram of a method. Video content comprising a plurality of frames may be received at step 310. The video content and/or the plurality of frames may comprise raw video data, such as High Dynamic Range (HDR) uncompressed video data. The video content may be received by a video encoder (e.g., the video encoder 130 in FIG. 1) and/or a video preprocessor (e.g., the video preprocessor 120 in FIG. 1).

At step 320, one or more of first luminance pixel data associated with a first frame of the plurality of frames and first chrominance pixel data associated with the first frame may be determined, such as by the video encoder 130 in FIG. 1 and/or the video preprocessor 120 in FIG. 1. The first frame may comprise a plurality of partitions, and the one or more of first luminance pixel data and first chrominance pixel data may be associated with a first partition of the plurality of partitions. The plurality of partitions may comprise a plurality of at least one of blocks, macroblocks, and code tree units. The one or more of first luminance pixel data and first chrominance pixel data may comprise residual image data. The residual image data may result from a prediction step in an encoding process, such an intra-frame prediction and/or inter-frame prediction. The residual image data may comprise spatial residual data. The spatial residual data may refer to a second partition of the first frame. The residual image data may comprise temporal residual data. The temporal residual data may refer to another partition of a prior or following frame of the plurality of frames.

At step 330, a first viewing parameter associated with playback of the video content may be determined. The first viewing parameter associated with playback of the video content may be determined by the video encoder 130 in FIG. 1 and/or the video preprocessor 120 in FIG. 1. The first viewing parameter may indicate a viewing condition associated with playback of the video content. The first viewing parameter may comprise one or more of a viewing distance, a pixel density, a pixel length of a sinusoidal grating cycle, a width of a display associated with playback of the video content, a viewing angle, ambient illumination level, and a reflection coefficient of a display associated with playback of the video content.

A viewing parameter may be determined by real-time or near real-time feedback. The viewing parameter may be determined using a sensor, which may be positioned proximate the viewing environment. The sensor may be associated with or form part of the decoder or other device (e.g., a set-top device) causing output of the video content. The sensor may be incorporated with a remote control device, such as to measure and/or estimate a relative distance between a viewer and the display. The measured viewing parameter may be communicated to the video encoder 130 in FIG. 1 and/or video preprocessor immediately or according to a longer time interval.

A viewing parameter may be pre-determined at the time of encoding the video content. The video encoder 130 in FIG. 1 and/or an entity associated with the video encoder 130 in FIG. 1 may already store the viewing parameter when the video content is encoded. Such viewing parameter may be based on information previously provided by an expectant viewer, a user/entity associated with the configuration of the viewing environment, a user/entity providing the video stream, etc. A cable provider may be aware of a room type in which a set-top box is installed and one or more viewing parameters may be determined or estimated according to that room type. A technician may measure one or more viewing parameters during an installation of the set-top box. The technician and/or the viewer may indicate the make and model of the display associated with the set-top box, from which various viewing parameters may be determined (e.g., display resolution, etc.).

At step 340, a first quantization matrix associated with the first frame may be generated (e.g., determined) based on the first viewing parameter. The first quantization matrix may be additionally or alternatively based on the first frame. The first quantization matrix associated with the first frame may be additionally or alternatively based on the one or more of first luminance pixel data and first chrominance pixel data associated with the first frame. The video encoder 130 in FIG. 1 and/or the video preprocessor 120 in FIG. 1 may determine the first quantization matrix.

The generating the first quantization matrix may comprise adjusting (e.g., modifying, updating, etc.), at least in part, a previously-determined quantization matrix associated with the video content. Adjusting the previously-determined quantization matrix may comprise determining the first quantization matrix based on the previously-determined quantization matrix. Adjusting the previously-determined quantization matrix to determine the first quantization matrix may be based on a corresponding change in viewing parameters (e.g., an increase or decrease to an ambient illumination level in the viewing environment). The previously-determined quantization matrix may be one determined for another (e.g., previous) partition of the first frame or for another (e.g., previous) frame (or partition thereof) of the plurality of frames.

Adjusting, at least in part, the previously-determined quantization matrix may be performed on a matrix entry-by-matrix entry basis. For example, determining a first entry of the first quantization matrix may comprise adjusting (e.g., modifying or updating) a corresponding first entry of the previously-determined quantization matrix. As another example, determining a first entry of the first quantization matrix may comprise carrying forward (i.e., without changing) or copying a corresponding first entry of the previously-determined quantization matrix to the first entry of the first quantization matrix.

The first quantization matrix may be determined based on a first contrast sensitivity function (CSF). The first CSF may be determined (e.g., generated) based on the first viewing parameter. The first CSF may be determined based, additionally or alternatively, on one or more of the first frame and the one or more of first luminance pixel data and first chrominance pixel data. The video encoder 130 in FIG. 1 may determine the first CSF. The video preprocessor 120 in FIG. 1 may determine the first CSF.

The first quantization matrix and/or the first CSF may be determined based on a characteristic of the first partition and/or the first frame comprising the first partition. The first quantization matrix and/or the first CSF may be determined based on the first frame comprising a scene cut.

At least a first portion of a coded video stream may be determined (e.g., generated) based on the first frame and the first quantization matrix. The video encoder 130 in FIG. 1 may determine at least a first portion of a coded video stream based on the first frame and the first quantization matrix. The video preprocessor 120 in FIG. 1 may determine at least a first portion of a coded video stream based on the first frame and the first quantization matrix.

Determining (e.g., generating) at least the first portion of the coded video stream may comprise determining, based on a linear transformation of at least a portion of the one or more of first luminance pixel data and first chrominance pixel data, a plurality of transform coefficients associated with the first frame. The video encoder 130 and/or the video preprocessor 120 in FIG. 1 may determine the plurality of transform coefficients associated with the first frame. The plurality of transform coefficients may be organized in a table or matrix corresponding to the first quantization matrix. Determining at least the first portion of the coded video stream may comprise quantizing, based on the first quantization matrix, the plurality of transform coefficients. The video encoder 130 and/or video preprocessor 120 in FIG. 1 may quantize the plurality of transform coefficients based on the first quantization matrix. Determining at least the first portion of the coded video stream may comprise performing entropy encoding on the quantized plurality of transform coefficients. The video encoder 130 and/or video preprocessor 120 in FIG. 1 may perform the entropy encoding on the quantized plurality of transform coefficients.

One or more of second luminance pixel data associated with a second frame of the plurality of frames and second chrominance pixel data associated with the second frame may be determined, such as by the video encoder 130 and/or video preprocessor 120 in FIG. 1. A second viewing parameter associated with playback of the video content may be determined, such as by the video encoder 130 and/or video preprocessor 120 in FIG. 1. A second quantization matrix associated with the second frame may be determined based the second viewing parameter. The second quantization matrix associated with the second frame may be based, additionally or alternatively, on one or more of the second frame and the one or more of second luminance pixel data and second chrominance pixel data. The video encoder 130 and/or the video preprocessor 120 in FIG. 1 may determine the second quantization matrix associated with the second frame.

At least a second portion of the coded video stream may be determined (e.g., generated) based on the second frame and the second quantization matrix. The video encoder 130 and/or the video preprocessor 120 in FIG. 1 may determine the at least a second portion of the coded video stream based on the second frame and the second quantization matrix. A second CSF may be determined based on the second viewing parameter. The second CSF may be based, additionally or alternatively, on one or more of the second frame and the one or more of second luminance pixel data and second chrominance pixel data. The video encoder 130 and/or the video preprocessor 120 in FIG. 1 may determine the second CSF. The second quantization matrix may be based, additionally or alternatively, on the second CSF.

The first quantization matrix may be transmitted (e.g., sent, delivered, provided, etc.) to an associated decoder. The video encoder 130 and/or the video preprocessor 120 in FIG. 1 may transmit the first quantization matrix to the video decoder 140 in FIG. 1. The first quantization matrix may be transmitted to the decoder in conjunction with the associated coded video stream. The first quantization matrix may be transmitted to the decoder as part of the coded video stream. The decoder may use the first quantization matrix in decoding the encoded video stream.

A user may cause a set-top box to request video content from a video delivery system, such as a video on-demand system. The set-top box may be configured to decode encoded video content, such as indicated in an encoded video stream. The set-top box may be configured to determine a viewing parameter. The set-top box may comprise a sensor, such as a sensor for measuring the level of ambient light in the room with the set-top box. The set-top box may transmit (e.g., send, deliver, provide, etc.) a signal indicative of the sensed level of ambient light to a video encoder or other system associated with the video delivery system. The video encoder (or other system) may determine a quantization matrix based on the sensed ambient lighting in the set-top box's room or other viewing environment. The video encoder (or other system) may determine a CSF based on the ambient lighting in the set-top box's room. The quantization matrix may be determined based on the CSF. The video encoder may receive the video content in a raw video format. The video encoder may encode the requested video content based on the quantization matrix. Encoding the video content may comprise determining, based on the quantization matrix, a quantized transform (e.g., DCT) coefficient matrix. The quantized transform coefficient matrix may be subjected to entropy encoding. The encoded video content may comprise the entropy-encoded transform coefficient matrix.

With the encoded video content being based on the quantization matrix (which may be based in turn on the level of ambient lighting) the encoded video content may be customized to omit image data in the encoded video content that would be imperceptible to the user under those ambient lighting conditions in the set-top box's room. The encoded video content may therefore require less bandwidth than it would otherwise. The encoded video content may comprise video content that underwent enhanced encoding from processing resources that were diverted from the processing resources that otherwise were intended to encode the omitted image data. The encoded video content may comprise video content represented by additional bits of image data that would otherwise have represented the omitted image data. Thus the encoded video content may be transmitted at a reduced bandwidth, with better image quality, or some combination thereof.

The video encoder may transmit (e.g., send, deliver, provide, etc.) the encoded video content to the set-top box via a network. The quantization matrix may be transmitted to the set-top box via the network. The encoded video content may be transmitted to the decoder as an encoded video stream comprising a plurality of encoded frames. The set-top box may decode the encoded video content using the one or more quantization matrices. The set-top box may cause the decoded video content to be output via an associated display device, such as a television.

Encoded video content, which may be indicated via an encoded video stream, may be transmitted to a video decoder. A quantization matrix associated with at least a portion of the encoded video content, may be transmitted to the video decoder. The encoded video content may comprise the quantization matrix. The decoder may decode at least a portion of the encoded video content based on the associated quantization matrix.

Figure 4:
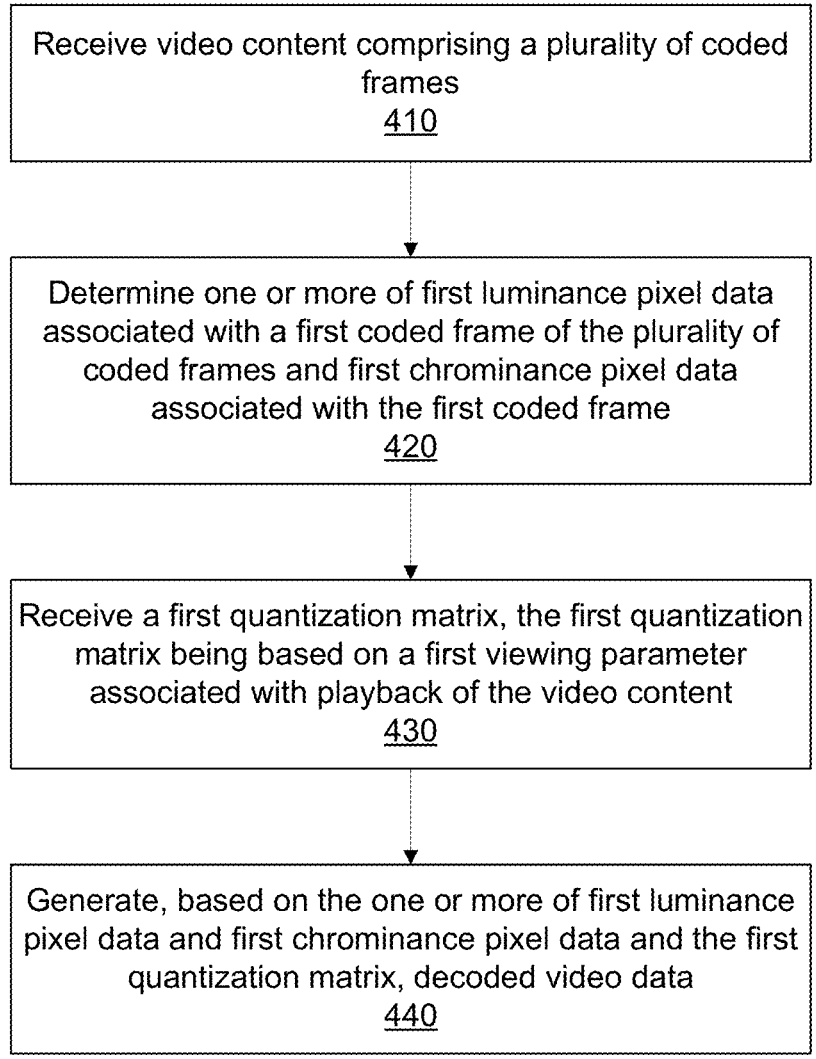
FIG. 4 is a flow diagram of a method.

FIG. 4 is a flow diagram of a method. Video content comprising a plurality of coded frames may be received, at step 410. A video decoder (e.g., the video decoder 140 in FIG. 1) may receive the video content comprising the plurality of coded frames. The video content may comprise High Dynamic Range (HDR) compressed video content, but is not so limited. The video content may comprise Standard Dynamic Range (SDR) compressed video content.

At step 420, one or more of first luminance pixel data associated with a first coded frame of the plurality of coded frames and first chrominance pixel data associated with the first coded frame may be determined. The video decoder 140 in FIG. 1 may determine the one or more of first luminance pixel data associated with a first coded frame of the plurality of coded frames and first chrominance pixel data associated with the first coded frame. The one or more of first luminance pixel data and first chrominance pixel data may comprise a plurality of quantized transform coefficients. The first coded frame may comprise a plurality of partitions and the one or more of first luminance pixel data and first chrominance pixel data may be associated with a first partition of the plurality of partitions. The plurality of partitions may comprise a plurality of at least one of blocks, macroblocks, and coding tree units. The one or more of first luminance pixel data and first chrominance pixel data may comprise residual image data. The residual image data may comprise spatial residual data. The residual image data may comprise temporal residual data.

At step 430, a first quantization matrix may be received. The first quantization matrix may have been determined based on (e.g., derived from) a first viewing parameter associated with playback of the video content. The first quantization matrix may be associated with the first coded frame of the plurality of coded frames. The first quantization matrix may be transmitted and/or received in association with transmitting and/or receiving the first coded frame. The first coded frame may have been determined (e.g., encoded, compressed, etc.) based on the first quantization matrix. The video decoder 140 in FIG. 1 may receive the first quantization matrix. The first viewing parameter may comprise one or more of a viewing distance, a pixel density, a pixel length of a sinusoidal grating cycle, a width of a display associated with playback of the video content, a viewing angle, ambient illumination level, and a reflection coefficient of a display associated with playback of the video content.

The first viewing parameter may be associated with the decoder and/or the device requesting the video content (which may be one and the same). The decoder and/or other requesting device may be the device via which the decoded video content is expected to be output to the viewer. The decoder and/or other requesting device may comprise the display via which the video content is expected to be output to the viewer. The first viewing parameter may reflect a viewing condition present at the environment or location of the decoder and/or other device requesting the video content. The first view parameter may have been transmitted from the decoder and/or the requesting device to the video encoder, the video preprocessor, and/or another associated entity. The first viewing parameter may have been indicated by a user, owner, and/or servicing entity associated with the decoder and/or requesting device. The first viewing parameter may have been indicated by a user, owner, and/or servicing entity before the video content was requested.

A set-top box may comprise the decoder and may be situated in a living room. The set-top box may be connected to a television display. The set-top box may request the video content. The viewing parameter used to determine the first quantization matrix may indicate a characteristic of the living room (e.g., the ambient lighting in the living room, the distance between the television display and furniture, the viewing angle between the television display and the furniture, etc.) and/or the television display (e.g., the dimensions of the display, the resolution of the display, etc.).

At step 440, decoded video data may be generated (e.g., determined) based on the one or more of first luminance pixel data and first chrominance pixel data and the first quantization matrix. The decoded video data may be output (e.g., caused to be output) based on the one or more of first luminance pixel data and first chrominance pixel data. The decoded video data may comprise a decoded first frame (corresponding to the first frame) of a plurality of decoded frames. The video decoder 140 in FIG. 1 may cause output of decoded video data based on the one or more of first luminance pixel data and first chrominance pixel data associated with the first frame and the first quantization matrix. Generating (e.g., determining) the decoded video data may comprise determining, based on the first quantization matrix and the plurality of quantized transform coefficients (e.g., indicated by or in the one or more of first luminance pixel data and first chrominance pixel data), a plurality of rescaled transform coefficients. The video decoder 140 in FIG. 1 may determine the plurality of rescaled transform coefficients. Generating the decoded video data may comprise performing an inverse linear transformation of the plurality of rescaled transform coefficients. The video decoder 140 in FIG. 1 may perform the inverse linear transformation of the plurality of rescaled transform coefficients.

The decoded video data may be based on the inverse-transformed plurality of rescaled transform coefficients. A plurality of rescaled transform coefficients associated with a first partition of the first coded frame may be determined based on the first quantization matrix and the one or more of first luminance pixel data and first chrominance pixel data. The video decoder 140 in FIG. 1 may determine the plurality of rescaled transform coefficients associated with the first partition. Causing output of the decoded video data may be further based on the plurality of rescaled transform coefficients associated with the first partition of the first coded frame.

Causing output of the decoded video data may comprise causing the decoded video data to be output via a display. Causing the decoded video data to be output via the display may comprise transmitting a signal, indicating the decoded video data, to the display. The display may comprise a television display communicatively connected to the decoder (e.g., a set-top box). The display may comprise a display on a mobile device and the mobile device may comprise the decoder. The display may comprise a computer display and the computer may comprise the decoder.

One or more of second luminance pixel data associated with a second coded frame of the plurality of coded frames and second chrominance pixel data associated with the second coded frame may be determined. The video decoder 140 in FIG. 1 may determine one or more of second luminance pixel data associated with the second coded frame of the plurality of coded frames and second chrominance pixel data associated with the second coded frame. A second quantization matrix, based on (e.g., derived from) a second viewing parameter associated with playback of the video content, may be received. The video decoder 140 in FIG. 1 may receive the second quantization matrix. The decoded video data may be further based on the one or more of second luminance pixel data and second chrominance pixel data and the second quantization matrix.

Figure 5:
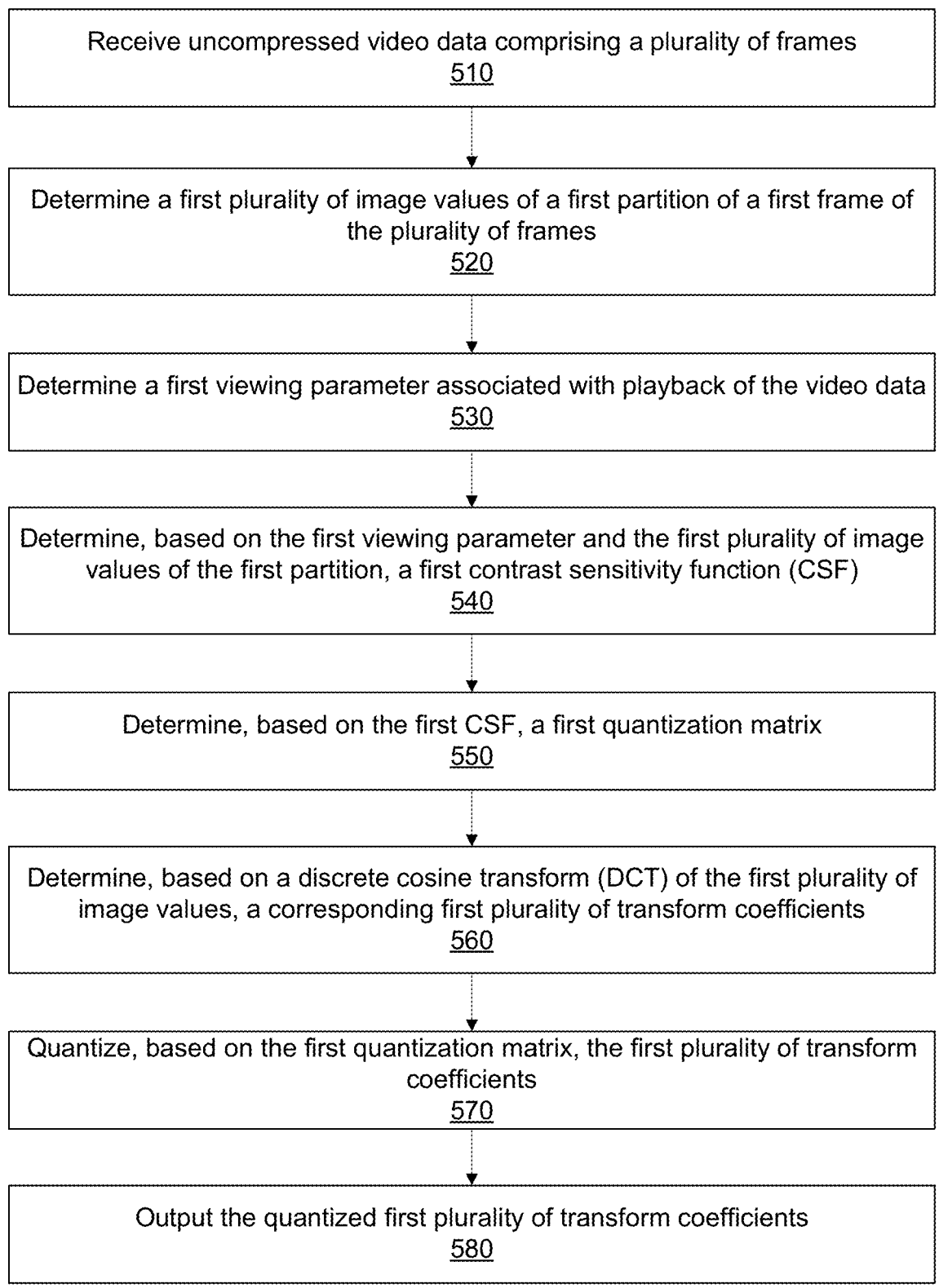
FIG. 5 is a flow diagram of a method.

FIG. 5 is a flow diagram of a method. Uncompressed video data comprising a plurality of frames may be received, at step 510. The video encoder 130 in FIG. 1 may receive the uncompressed video data comprising a plurality of frames. The video preprocessor 120 in FIG. 1 may receive the uncompressed video data comprising a plurality of frames. A frame of the plurality of frames may comprise a plurality of partitions. A partition of the plurality of partitions may indicate a plurality of image values. A partition may comprise a block, a macroblock, and/or a coding tree unit. An image value of a partition may comprise a pixel value. Thus, a partition may comprise a plurality of pixel values. The plurality of pixel values may comprise an 8×8 set of image values. An image value may indicate a luminance value and/or a chrominance value (e.g., a U or V value).

At step 520, a first plurality of image values of a first partition of a first frame of the plurality of frames may be determined. The video encoder 130 in FIG. 1 may determine the first plurality of image values of the first partition of the first frame of the plurality of frames. The video preprocessor 120 in FIG. 1 may determine the first plurality of image values of the first partition of the first frame of the plurality of frames. The first plurality of image values may indicate at least one of luminance pixel values and chrominance pixel values. The first plurality of image values may indicate residual values, such as spatial residual values or temporal residual values. The first partition may comprise at least one of a block, a macroblock, and a coding tree unit.

At step 530, a first viewing parameter associated with playback of the video data may be determined. The video encoder 130 in FIG. 1 may determine the first viewing parameter associated with playback of the video data. The video preprocessor 120 in FIG. 1 may determine the first viewing parameter associated with playback of the video data. The first viewing parameter may comprise one or more of a viewing distance, a pixel density, a pixel length of a sinusoidal grating cycle, a width of a display associated with playback of the video data, a viewing angle, ambient illumination level, and a reflection coefficient of a display associated with playback of the video data.

At step 540, a first contrast sensitivity function (CSF) may be determined based on the first viewing parameter. The first CSF may be determined based on, additionally or alternatively, the first plurality of image values of the first partition. The video encoder 130 in FIG. 1 may determine the first CSF. The video preprocessor 120 in FIG. 1 may determine the first CSF. The first CSF may reflect the expected viewer's ability to perceive differences in image detail and/or motion under the determined viewing parameters. The first CSF may indicate generally that the viewer will be able to perceive greater image detail and/or motion than would otherwise. The first CSF may indicate generally that the viewer will have a reduced ability to perceive image detail and/or motion. The first CSF may indicate that the viewer will have a greater ability to perceive image detail and/or motion at some subset of the spectrum of spatial frequencies while the viewer will have reduced ability to perceive image detail and/or motion at another, different subset of the spectrum of spatial frequencies.

The determining the first CSF may comprise modifying (e.g., adjusting, updating, etc.) a standardized CSF that is based on the HVS but is agnostic as to any other factors that may affect a person's (e.g., a viewer's) ability to differentiate image details and/or motions beyond a spatial frequency threshold. The standardized CSF may indicate that a viewer should be able to perceive certain image details and/or motion, but, in fact, the viewer is not able to perceive those image details and/or motion under the actual viewing parameters. The first CSF may account for the effects, positive or negative, to image detail and/or motion perception that the viewing parameters are expected to cause.

At step 550, a first quantization matrix may be determined based on the first CSF. The video encoder 130 in FIG. 1 may determine the first quantization matrix based on the first CSF. The video preprocessor 120 in FIG. 1 may determine the first quantization matrix based on the first CSF. The first CSF may indicate the spatial frequency threshold beyond which a viewer, under the viewing parameters, will be unable to perceived differences in image detail and/or motion. The first quantization matrix may be determined such as to omit image data that will be or is likely to be imperceptible to a viewer under the determined viewing parameters (e.g., the viewing conditions during playback, aspects of the display, etc.).

At step 560, a corresponding first plurality of transform coefficients (associated with the first partition) may be determined based on a discrete cosine transform (DCT) of the first plurality of image values of the first partition. The video encoder 130 in FIG. 1 may determine the corresponding first plurality of transform coefficients based on a DCT of the first plurality of image values of the first partition. The video preprocessor 120 in FIG. 1 may determine the corresponding first plurality of transform coefficients based on a DCT of the first plurality of image values of the first partition. The first plurality of transform coefficients may be formed as a matrix of transform coefficients.

At step 570, the first plurality of transform coefficients may be quantized based on the first quantization matrix. The video encoder 130 in FIG. 1 may quantize the first plurality of transform coefficients based on the first quantization matrix. The video preprocessor 120 in FIG. 1 may quantize the first plurality of transform coefficients based on the first quantization matrix. The first plurality of transform coefficients may be quantized such as to omit image data that would be imperceptible to the viewer under the determined viewing parameters. The transform coefficients that correspond to the image data that are determined to be imperceptible to the viewer may be reduced to "0" within the plurality of transform coefficients.

At step 580, the quantized first plurality of transform coefficients may be output. The video encoder 130 in FIG. 1 may output the quantized first plurality of transform coefficients. The video preprocessor 120 in FIG. 1 may output the quantized first plurality of transform coefficients. The outputting the first plurality of transform coefficients may comprise entropy encoding the quantized first plurality of transform coefficients. The video encoder 130 in FIG. 1 may entropy encode the quantized first plurality of transform coefficients. The video preprocessor 120 in FIG. 1 may entropy encode the quantized first plurality of transform coefficients. The entropy encoding may comprise fixed length coding, variable length coding, context adaptive variable length coding, and/or context adaptive binary arithmetic coding. The entropy encoding may comprise Huffman encoding.

The outputting the first plurality of transform coefficients may comprise outputting compressed video data. The video encoder 130 in FIG. 1 may output the compressed video data. The video preprocessor 120 in FIG. 1 may output the compressed video data. The compressed video data may comprise the entropy-encoded, quantized first plurality of transform coefficients. The compressed video data may be incorporated in an encoded video stream. The compressed video data may be output for playback. A decoder may receive the compressed video data (e.g., the encoded video stream) and decode the compressed video data. The decoded video data may be output (e.g., presented) to a viewer, such as via a display device.

For one or more additional partitions of the plurality of partitions of the first frame, a corresponding plurality of transform coefficients of an additional partition may be determined based on a discrete cosine transform (DCT) of the plurality of image values of the additional partition. The video encoder 130 in FIG. 1 may determine the corresponding plurality of transform coefficients of the additional partition. The video preprocessor 120 in FIG. 1 may determine the corresponding plurality of transform coefficients of the additional partition. The plurality of transform coefficients of the additional partition may be quantized based on the first quantization matrix. The video encoder 130 in FIG. 1 may quantize the plurality of transform coefficients of the additional partition based on the first quantization matrix. The video preprocessor 120 in FIG. 1 may quantize the plurality of transform coefficients of the additional partition based on the first quantization matrix.

The quantized plurality of transform coefficients of the additional partition may be entropy encoded. The video encoder 130 in FIG. 1 may entropy encode the quantized plurality of transform coefficients of the additional partition. The video preprocessor 120 in FIG. 1 may entropy encode the quantized plurality of transform coefficients of the additional partition. The compressed video data may further comprise the entropy-encoded, quantized plurality of transform coefficients of each additional partition of the plurality of partitions of the first frame.

Figure 6:
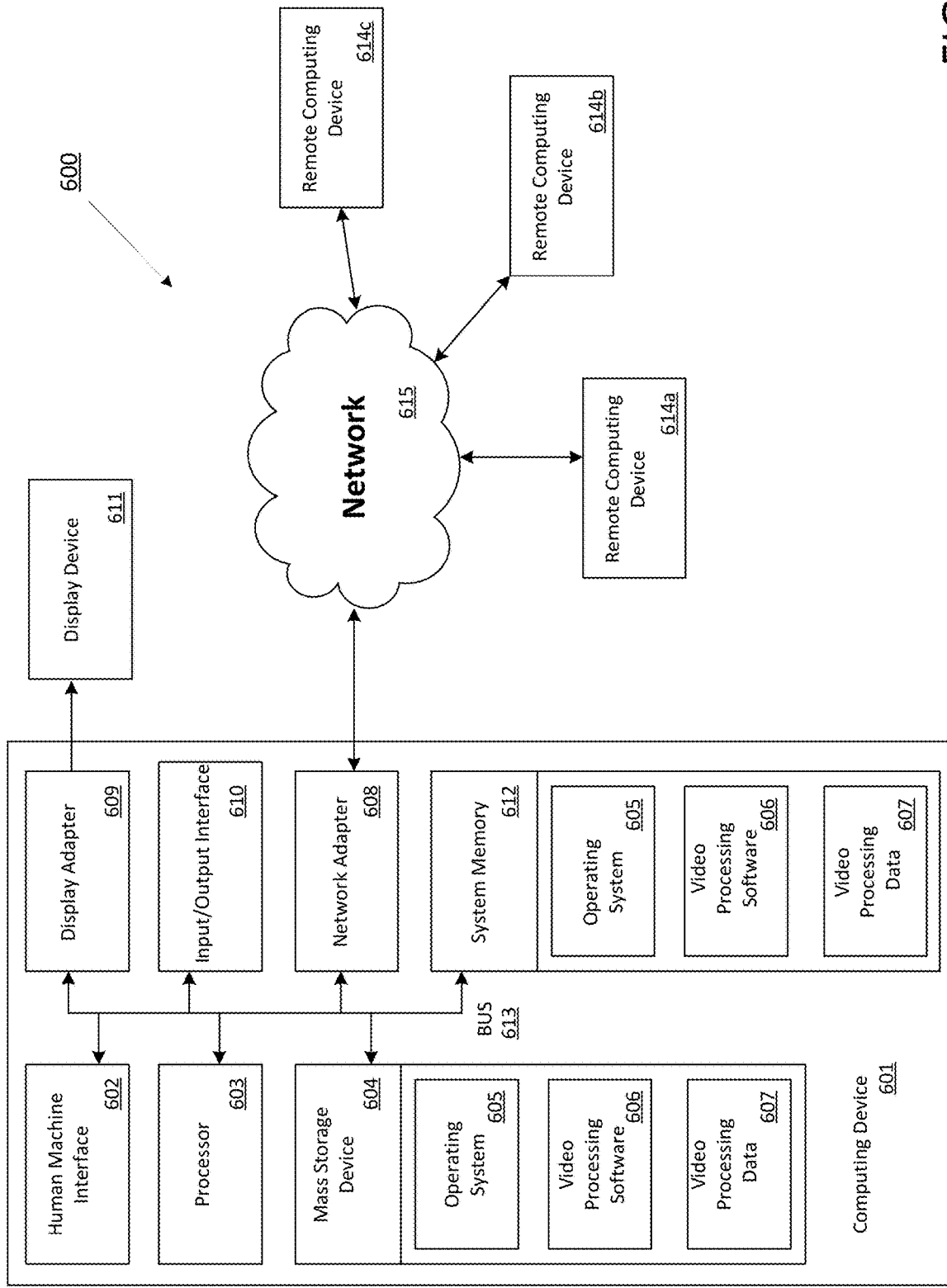
FIG. 6 is a block diagram of a system environment.

FIG. 6 shows an operating environment 600, but is not intended to suggest any limitation as to the scope of use or functionality of operating environment architecture. Neither should the operating environment be interpreted as having any dependency or requirement relating to any one or combination of components shown in the operating environment.

The present methods, systems, and apparatuses may be operational with numerous other general purpose or special purpose computing system environments or configurations. Examples of well-known computing systems, environments, and/or configurations that may be suitable for use with the methods, systems, and apparatuses comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods, systems, and apparatuses may be performed by software components. The disclosed methods, systems, and apparatuses may be described in the general context of computer-executable instructions, such as program modules, being executed by one or more computers or other devices. Generally, program modules comprise computer code, routines, programs, objects, components, data structures, etc. that performs particular tasks or implements particular abstract data types. The disclosed methods may be practiced in grid-based and distributed computing environments where tasks may be performed by remote processing devices that are linked through a communications network. In a distributed computing environment, program modules may be located in both local and remote computer storage media including memory storage devices.

Further, the methods, systems, and apparatuses disclosed may be implemented via a general-purpose computing device in the form of a computing device 601. The components of the computing device 601 may comprise, but are not limited to, one or more processors or processing units 603, a system memory 612, and a system bus 613 that couples various system components including the processor 603 to the system memory 612. In the case of multiple processing units 603, the system may utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 613, and all buses specified in this description may be implemented over a wired or wireless network connection and each of the subsystems, including the processor 603, a mass storage device 604, an operating system 605, video processing software 606, video processing data 607, a network adapter 608, system memory 612, an Input/Output Interface 610, a display adapter 609, a display device 611, and a human machine interface 602, may be contained within one or more remote computing devices 614*a,b,c* at physically separate locations, connected through buses of this form, in effect implementing a fully distributed system.

The computing device 601 typically comprises a variety of computer readable media. Example readable media may be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as video processing data 607 and/or program modules such as operating system 605 and video processing software 606 that are immediately accessible to and/or are presently operated on by the processing unit 603.

The computing device 601 may comprise other removable/non-removable, volatile/non-volatile computer storage media. By way of example, FIG. 6 shows a mass storage device 604 which may provide non-volatile storage of computer code, computer readable instructions, data structures, program modules, and other data for the computing device 601. For example and not limitation, a mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 604, including by way of example, an operating system 605 and video processing software 606. Each of the operating system 605 and video processing software 606 (or some combination thereof) may comprise elements of the programming and the video processing software 606. Video processing data 607 may be stored on the mass storage device 604. Video processing data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 601 via an input device (not shown). Examples of such input devices may comprise, but are not limited to, a keyboard, pointing device (e.g., a "mouse"), a microphone, a joystick, a scanner, tactile input devices such as gloves, and other body coverings, and the like These and other input devices may be connected to the processing unit 603 via a human machine interface 602 that is coupled to the system bus 613, but may be connected by other interface and bus structures, such as a parallel port, game port, an IEEE 1394 Port (also known as a Firewire port), a serial port, or a universal serial bus (USB).

A display device 611 may be connected to the system bus 613 via an interface, such as a display adapter 609. It is contemplated that the computing device 601 may have more than one display adapter 609 and the computing device 601 may have more than one display device 611. For example, a display device may comprise a monitor, an LCD (Liquid Crystal Display), or a projector. In addition to the display device 611, other output peripheral devices may comprise components such as speakers (not shown) and a printer (not shown) which may be connected to the computing device 601 via Input/Output Interface 610. Any step and/or result of the methods may be output in any form to an output device. Such output may comprise any form of visual representation, including, but not limited to, textual, graphical, animation, audio, tactile, and the like. The display device 611 and computing device 601 may comprise part of one device, or separate devices.

The computing device 601 may operate in a networked environment using logical connections to one or more remote computing devices 614*a,b,c*. By way of example, a remote computing device may comprise a personal computer, portable computer, a smart phone, a server, a router, a network computer, a peer device or other common network node. Logical connections between the computing device 601 and a remote computing device 614*a,b,c* may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are shown herein as discrete blocks, although such programs and components may reside at various times in different storage components of the computing device 601, and may be executed by the data processor(s) of the computer. An implementation of video processing software 606 may be stored on or transmitted across some form of computer readable media. Any of the disclosed methods may be performed by computer readable instructions embodied on computer readable media. Computer readable media may comprise any available media that may be accessed by a computer. By way of example and not limitation, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
receiving video content comprising a plurality of frames;
receiving, from a device configured for output of video, a viewing parameter associated with output of the video content;
determining one or more of luminance pixel data associated with a frame of the plurality of frames or chrominance pixel data associated with the frame;
determining, based on the viewing parameter and the one or more of luminance pixel data or chrominance pixel data, a first quantization matrix associated with the frame; and
encoding, based at least in part on the first quantization matrix, at least a portion of the video content.

2. The method of claim 1, further comprising:
determining, based on the viewing parameter and the one or more of luminance pixel data or chrominance pixel data, a contrast sensitivity function (CSF),
wherein the first quantization matrix is based on the CSF.

3. The method of claim 1, further comprising:
sending at least a portion of a coded video stream.

4. The method of claim 1, wherein encoding at least a portion of the video content comprises:
quantizing, based on the first quantization matrix, a plurality of transform coefficients associated with at least a portion of the one or more of luminance pixel data or chrominance pixel data; and
entropy encoding the quantized plurality of transform coefficients.

5. The method of claim 1, wherein the one or more of luminance pixel data or chrominance pixel data comprises residual image data.

6. The method of claim 1, wherein the frame comprises a plurality of partitions and the one or more of luminance pixel data or chrominance pixel data is associated with a partition of the plurality of partitions.

7. The method of claim 6, wherein the plurality of partitions comprises a plurality of at least one of blocks, macroblocks, or code tree units.

8. The method of claim 1, wherein determining the first quantization matrix comprises at least one of modifying an entry of a second quantization matrix to determine a corresponding entry of the first quantization matrix or copying a second entry of a second quantization matrix to a corresponding entry of the first quantization matrix.

9. The method of claim 1, wherein the viewing parameter is based on at least one of a viewing distance, a pixel density, a pixel length of a sinusoidal grating cycle, a width of a display associated with output of the video content, a viewing angle, ambient illumination level, or a reflection coefficient of a display associated with output of the video content.

10. A method comprising:
sending, by a device configured for output of video, a viewing parameter associated with output of video content;
receiving, by the device, the video content, wherein the video content comprises a plurality of coded frames, wherein at least a portion of the plurality of coded frames is encoded, based at least in part, on the viewing parameter;
determining one or more of luminance pixel data associated with a coded frame of the plurality of coded frames or chrominance pixel data associated with the coded frame;
receiving a quantization matrix, wherein the quantization matrix is based on the viewing parameter; and
generating, by the device and based on the quantization matrix and the one or more of luminance pixel data or chrominance pixel data, decoded video data.

11. The method of claim 10, further comprising:
causing output of the decoded video data.

12. The method of claim 10, wherein the one or more of luminance pixel data or chrominance pixel data comprises a plurality of quantized transform coefficients.

13. The method of claim 12, wherein generating the decoded video data comprises:
determining, based on the quantization matrix and the plurality of quantized transform coefficients, a plurality of rescaled transform coefficients; and
determining, based on an inverse linear transformation of the plurality of rescaled transform coefficients, an inverse-transformed plurality of rescaled transform coefficients, wherein the decoded video data is based on the inverse-transformed plurality of rescaled transform coefficients.

14. The method of claim 10, wherein the viewing parameter is based on at least one of a viewing distance, a pixel density, a pixel length of a sinusoidal grating cycle, a width of a display associated with output of the video content, a viewing angle, ambient illumination level, or a reflection coefficient of a display associated with output of the video content.

15. The method of claim 10, wherein the coded frame comprises a plurality of partitions and the one or more of luminance pixel data or chrominance pixel data is associated with a partition of the plurality of partitions, and wherein generating the decoded video data comprises:
determining, based on the quantization matrix and the one or more of luminance pixel data or chrominance pixel data, a plurality of rescaled transform coefficients associated with the partition; and
determining, based on an inverse linear transformation of the plurality of rescaled transform coefficients associated with the partition, an inverse-transformed plurality of rescaled transform coefficients associated with the partition, wherein the decoded video data is based on the inverse-transformed plurality of rescaled transform coefficients associated with the partition.

16. A method comprising:
receiving uncompressed video data comprising a plurality of frames, wherein a frame of the plurality of frames comprises a plurality of partitions;
receiving, from a device configured for output of video, a viewing parameter associated with output of the video data;
determining, based on the viewing parameter, a quantization matrix; and
encoding, based at least in part on the viewing parameter, at least a portion of the video data.

17. The method of claim 16, further comprising:
determining a plurality of image values of a partition of a frame of the plurality of frames, wherein a partition of the plurality of partitions indicates a plurality of image values; and
determining, based on the viewing parameter and on the plurality of image values of the partition, a contrast sensitivity function (CSF).

18. The method of claim 17, further comprising:
- determining, based on a discrete cosine transform (DCT) of the plurality of image values of the partition, a corresponding plurality of transform coefficients;
- quantizing, based on the quantization matrix, the plurality of transform coefficients;
- entropy encoding the quantized plurality of transform coefficients; and
- outputting the quantized plurality of transform coefficients.

19. The method of claim 18, wherein outputting the quantized plurality of transform coefficients further comprises:
- outputting compressed video data, comprising the entropy-encoded quantized plurality of transform coefficients, for output.

20. The method of claim 17, wherein the plurality of image values of the partition indicate residual values.

21. The method of claim 1, wherein the device configured for output of video comprises at least one a sensor, a decoder, a set-top device, or a remote control device.

* * * * *